(12) United States Patent
Northall et al.

(10) Patent No.: US 10,577,956 B2
(45) Date of Patent: Mar. 3, 2020

(54) GAS TURBINE ENGINE VANES

(71) Applicant: ROLLS-ROYCE plc, London (GB)

(72) Inventors: Richard Northall, Derby (GB); Anthony J. Rae, Derby (GB); Michael S. Krautheim, Fountaintown, IN (US); Alastair D. Walker, Derby (GB); Jonathan F. Carrotte, Derby (GB); Ian Mariah, Derby (GB)

(73) Assignee: ROLLS-ROYCE plc, London (GB)

( * ) Notice: Subject to any disclaimer, the term of this patent is extended or adjusted under 35 U.S.C. 154(b) by 235 days.

(21) Appl. No.: 15/907,538

(22) Filed: Feb. 28, 2018

(65) Prior Publication Data
US 2018/0252113 A1 Sep. 6, 2018

(30) Foreign Application Priority Data

Mar. 3, 2017 (GB) .................................. 1703423.2

(51) Int. Cl.
*F01D 5/14* (2006.01)
*F01D 9/04* (2006.01)
(Continued)

(52) U.S. Cl.
CPC ............. *F01D 9/041* (2013.01); *F01D 5/141* (2013.01); *F01D 5/142* (2013.01); *F01D 9/065* (2013.01);
(Continued)

(58) Field of Classification Search
CPC .......... F01D 5/141; F01D 5/147; F01D 9/041; F05D 2240/129
See application file for complete search history.

(56) References Cited

U.S. PATENT DOCUMENTS 3,617,147 A  11/1971  Bragg et al.
4,989,406 A * 2/1991  Vdoviak ............... F01D 25/162
                                                    244/117 A
(Continued)

FOREIGN PATENT DOCUMENTS

EP  0942150  9/1999
EP  1756406  5/2008
(Continued)

OTHER PUBLICATIONS

Great Britain Search Report dated Jun. 16, 2017 issued in GB Patent Application No. 1703423.2.
(Continued)

*Primary Examiner* — Ninh H. Nguyen
(74) *Attorney, Agent, or Firm* — Simpson & Simpson, PLLC

(57) ABSTRACT

An annular array of turning vanes 200 is provided in a duct 100 of a gas turbine engine 10. The annular array of turning vanes 200 comprises aerodynamic vanes 220 and strut-vanes 240. The strut-vanes 240 have greater chord length and extend further axially downstream than the aerodynamic vanes 220. The leading edge of the strut-vanes 240 is upstream of the trailing edge of the aerodynamic vanes 220. The strut-vanes provide flow turning. The space to chord ratio of the aerodynamic vanes that are closest to the suction surface of a strut-vane is higher than the space to chord ratio of aerodynamic vanes that are closest to a pressure surface of the strut-vane. The arrangement allows the duct 100 to be axially short.

20 Claims, 8 Drawing Sheets

(51) Int. Cl.
    *F01D 9/06*         (2006.01)
    *F01D 9/02*         (2006.01)
    *F02K 3/04*         (2006.01)

(52) U.S. Cl.
    CPC ............... *F01D 9/023* (2013.01); *F02K 3/04* (2013.01); *F05D 2220/323* (2013.01); *F05D 2220/50* (2013.01); *F05D 2240/128* (2013.01); *F05D 2240/129* (2013.01); *Y02T 50/671* (2013.01); *Y02T 50/673* (2013.01)

(56) References Cited

U.S. PATENT DOCUMENTS

| | | | |
|---|---|---|---|
| 6,082,966 A | 7/2000 | Hall et al. | |
| 7,553,129 B2 | 6/2009 | Hoeger et al. | |
| 9,068,460 B2* | 6/2015 | Suciu | F01D 1/04 |
| 9,835,038 B2* | 12/2017 | Paradis | F01D 25/246 |
| 2011/0255964 A1 | 10/2011 | Clemen | |
| 2018/0156124 A1* | 6/2018 | Clements | F04D 29/542 |

FOREIGN PATENT DOCUMENTS

| | | |
|---|---|---|
| EP | 3121383 | 1/2017 |
| WO | 2014011246 | 1/2014 |

OTHER PUBLICATIONS

Great Britain Search Report dated May 30, 2017 issued in GB Patent Application No. 1703422.4.

\* cited by examiner

GAS TURBINE ENGINE VANES

CROSS-REFERENCE TO RELATED APPLICATIONS

This specification is based upon and claims the benefit of priority from UK Patent Application Number 1703423.2 filed on 3 Mar. 2017, the entire contents of which are incorporated herein by reference.

BACKGROUND

1. Field of the Disclosure

This disclosure relates to a gas turbine engine, for example ducts and/or vanes within a gas turbine engine, for example within a compressor section of a gas turbine engine.

2. Description of the Related Art

A gas turbine engine conventionally has one or more ducts, which may be annular ducts and/or may be provided in a core of a gas turbine engine. For example, one such duct may be provided between compressor sections of a gas turbine engine, such as between an intermediate pressure compressor section and a high pressure compressor section.

Such ducts may comprise structural struts that maintain the structural rigidity of the engine, for example in the region of the duct. The structural struts are typically non-lifting, i.e. they do not provide any appreciable flow-turning in use (for example at engine cruise conditions). Typically, the flow through the duct in use has nominally zero swirl (for example no circumferential component) because any swirl is removed upstream of the duct by a row of stator vanes, and the structural struts are thus not cambered, and typically have a symmetrical cross-section.

The requirement to provide structural struts means that the duct must be longer than would otherwise be necessary. This increases that length and weight of the overall engine.

Moving the structural struts axially upstream in the engine has undesirable impacts, such as mechanical forcing of the upstream rotor stage, which may cause dangerous instability.

Such mechanical forcing may be due to the potential field (and associated high static pressure) of the relatively large structural struts extending into the axial plane of the upstream rotor.

It is desirable to reduce the length and/or weight of a gas turbine engine with no (or at least reduced) operational impact.

SUMMARY

According to an aspect, there is provided a gas turbine engine defining axial, radial and circumferential directions. The gas turbine engine comprises a duct defined by an axially extending radially inner wall and an axially extending radially outer wall. An annular array of turning vanes is provided in the duct, the array comprising a set of cambered aerodynamic vanes and a set of cambered strut-vanes, the strut-vanes having trailing edges that extend further axially downstream than trailing edges of the aerodynamic vanes. The leading edges of the strut-vanes are axially upstream of the trailing edges of the aerodynamic vanes. A plurality of the aerodynamic vanes are provided in a gap defined by a suction surface of one of the strut-vanes and a pressure surface of another of the strut-vanes. The space to chord ratio of the aerodynamic vanes in the gap that are closest to the suction surface is higher than the space to chord ratio of aerodynamic vanes in the gap that are closest to the pressure surface.

As referred to herein, the term solidity may be used to refer to the space to chord ratio of the vanes. For example, the solidity for a particular vane may be defined as the average spacing between that vane and the two adjacent vanes (which may, for example, both be aerodynamic vanes or may be one aerodynamic vane and one strut-vane) divided by the vane chord. The spacing may be referred to as the pitch. The spacing may be the space between the camber lines of the vanes. Where the camber lines of the vanes are not the same, this may be the average spacing and/or the spacing at a particular point, such as the leading edge, trailing edge or mid-chord.

The duct may be said to be an annular duct. For example, a cross-section through the duct at a given axial location, and perpendicular to the axial direction, may be annular.

As used herein, the term axially downstream may be defined as being in the direction from a compressor to a turbine of a gas turbine engine. As used herein, the term axially upstream may be defined as being in the direction from a turbine to a compressor of a gas turbine engine.

The aerodynamic vanes and the strut-vanes may be said to be axially overlapping. At least a part (for example the leading edge and/or at least a part of the pressure surface and/or suction surface) of each strut-vane may be provided between the suction surface of one aerodynamic vane and the pressure surface of another aerodynamic vane. The strut-vanes may have greater chord length than the aerodynamic vanes.

A cambered vane may be a vane in which the mean camber line is curved and/or in which a tangent to the mean camber line changes direction along the camber line. For example, for cambered vanes described and/or claimed herein, the mean camber line may turn towards the axial direction in a downstream direction.

It will be appreciated that both the aerodynamic vanes and the strut-vanes may provide flow turning in use. The strut vanes may be referred to as aerodynamic strut-vanes.

Arrangements (for example of aerodynamic vanes and strut-vanes) as described and/or claimed herein may allow for a shorter than conventional duct. Such arrangements may have minimal or substantially no detrimental impact on engine efficiency and/operability. The strut-vanes and the aerodynamic vanes may both contribute towards the flow turning. For example, the strut-vanes may continue to provide flow turning (for example towards the axial direction) downstream of the trailing edges of the aerodynamic vanes. The flow direction (and/or the tangent to the camber line) need not be parallel to, or even substantially parallel to, the axial direction at the trailing edge of the aerodynamic vanes.

Control of the space to chord ratio (or solidity) as described and/or claimed herein may be effective in controlling the diffusion factor. In this regard, the diffusion factor may be used to characterize the velocity change along the suction surface of a vane, thereby providing a measure of the diffusion and adverse pressure gradient to which the boundary layer on the suction surface is subjected. Control of this parameter may be important as it may be a limiting factor in the achievable level of turning of a given vane.

The space to chord ratio of the aerodynamic vanes may increase across the gap from the pressure surface of the strut-vane that defines the gap to the suction surface of the other strut-vane that defines the gap in any desired manner or pattern. For example, the space to chord ratio of the aerodynamic vanes may increase continuously across the entire gap from the pressure surface of the strut-vane that defines the gap to the suction surface of the other strut-vane that defines the gap.

The space to chord ratio of the aerodynamic vanes may increase uniformly across the gap from the pressure surface of the strut-vane that defines the gap to the suction surface of the other strut-vane that defines the gap.

The space to chord ratio of the aerodynamic vanes may be uniform across at least a portion of the gap. For example, the space to chord ratio of the aerodynamic vanes may be uniform over a central portion of the gap, with only those aerodynamic vanes (for example 2, 3, 4 or 5) closest to the suction surface having higher space to chord ratio and/or only those aerodynamic vanes (for example 2, 3, 4 or 5) closest to the pressure surface having lower space to chord ratio.

The pitch (or spacing) of the aerodynamic vanes may be reduced towards (or adjacent) the pressure surface of the strut-vane defining the gap and/or increased towards (or adjacent) the suction surface of the other strut-vane defining the gap. The spacing (or pitch) between the two aerodynamic vanes that are closest to the suction surface of the strut-vane that defines the gap may be greater than the spacing between the two aerodynamic vanes that are closest to the pressure surface of the strut-vane that defines the gap.

The chord length of the aerodynamic vanes may be increased towards (or adjacent) the pressure surface of the strut-vane defining the gap and/or decreased towards (or adjacent) the suction surface of the other strut-vane defining the gap. The chord length of the aerodynamic vane that is closest to the suction surface of the strut-vane that defines the gap may be smaller than the chord length of the aerodynamic vane that is closest to the pressure surface of the strut-vane that defines the gap.

The spacing between all of the aerodynamic vanes may be uniform across the gap. In such an arrangement (and indeed in any arrangement), the chord length of the aerodynamic vanes may vary across the gap, for example with the vane or vanes closest to the suction surface of the strut-vane that defines the gap having a shorter chord or chords than the vane or vanes closest to the pressure surface of the other strut-vane that defines the gap.

All of the aerodynamic vanes in the gap may have the same chord length. In such an arrangement (and indeed in any arrangement), the spacing between the aerodynamic vanes may vary across the gap, for example with the vane or vanes closest to the suction surface of the strut-vane that defines the gap being spaced further from each other than the vane or vanes closest to the pressure surface of the other strut-vane that defines the gap.

A tangent to a mean camber line at the trailing edge of the strut-vanes may be more closely aligned to the axial direction than is a tangent to a mean camber line at the trailing edge of the aerodynamic vanes.

The mean camber line of the strut-vanes may be substantially the same as the mean camber line of the aerodynamic vanes (including, for example, all or at least some of the aerodynamic vanes) for axial locations between the leading and trailing edges of the aerodynamic vanes.

The mean camber line may be the line defined by the midpoints between the suction surface and the pressure surface along the chord of the vane. As referred to herein, the mean camber line may be the mean camber line at a given radial (or spanwise) position (for example, a given radial position between 5% and 95% of the vane span), or averaged over the span (or a portion of the span, such as 5% to 95%) of the vane. The mean camber line at a given radius may be determined by taking a cross-section at that radius, for example perpendicular to a radial direction.

There may be more aerodynamic vanes than strut-vanes. A plurality of aerodynamic vanes may be provided between two circumferentially adjacent strut-vanes. Purely by way of example, there may be in the range of from 2 to 20, for example 5 to 15, for example 8 to 12, for example around 10 more aerodynamic vanes than strut-vanes. Again, purely by way of example, there may be in the range of from 8 to 12 strut-vanes and/or in the range of from 80 to 120 aerodynamic vanes, but it will be appreciated that the present disclosure covers arrangements having any suitable numbers of vanes, which may be outside these ranges.

All of the aerodynamic vanes may be the same as each other. Alternatively, at least some of the aerodynamic blades may be different to each other. For example, there may be at least two different geometries of aerodynamic vanes, with one or more of each type of aerodynamic vane being provided. Where the aerodynamic blades are not all the same as each other, the mean camber line of the strut-vanes may be substantially the same as the mean camber line of at least some of the aerodynamic vanes for axial locations between the leading and trailing edges of the aerodynamic vanes.

The gas turbine engine may comprise a first compressor section and a second compressor section that is axially downstream of the first compressor section. The duct may be provided between the first compressor section and the second compressor section. Each of the radially inner wall and radially outer wall may extend axially downstream and radially inboard as it extends away from the first compressor section towards the second compressor section.

In such an arrangement, the first compressor section may comprise rotor blades that are connected to a first shaft that is also connected to a first turbine. The second compressor section may comprise rotor blades that are connected to a second shaft that is also connected to a second turbine. In use, the rotational speed of the second shaft may be higher than the rotational speed of the second shaft. The first shaft may be referred to as a low pressure shaft and/or the first compressor section may be referred to as a low (or intermediate) pressure compressor. The second shaft may be referred to as a high pressure shaft and/or the first compressor section may be referred to as a high pressure compressor.

The first compressor section may comprise at least two stages, each stage comprising a rotor row and a stator row. The second compressor section may comprise at least two stages, each stage comprising a rotor row and a stator row. Immediately upstream of the annular array of turning vanes (and/or immediately upstream of the duct) may be a rotor row of the first compressor section. Immediately downstream of the annular array of turning vanes (and/or immediately downstream of the duct) may be a rotor row of the second compressor section.

The axial position of the leading edges of the aerodynamic vanes may be the same as the axial position of the leading edge of the strut-vanes. This may mean that the axial position of the leading edges of the aerodynamic vanes may be substantially the same as the axial position of the leading edge of the strut-vanes, for example the axial position of the leading edges may be within 1%, 5% or 10% of the chord length of a strut-vane.

The tangent to the mean camber line of the aerodynamic vanes may not be parallel to the axial direction at the trailing edge. For example, the tangent to the mean camber line of the aerodynamic vanes may be in the range of from 5 degrees to 40 degrees from the axial direction.

By way of example only, the tangent to the mean camber line of the vanes of the strut-vanes at the trailing edge may be in the range of from 0 degrees to 15 degrees from the axial direction.

The geometry of the strut-vanes may be such that the mean camber line turns towards the axial direction downstream of the trailing edge of the aerodynamic vanes. For example, the mean camber line of the strut-vanes may turn towards the axial direction by an angle in the range of from 5 degrees and 30 degrees between the axial position of the trailing edge of the aerodynamic vanes and the trailing edge of the strut-vanes.

In some arrangement, the only features that extend between the radially inner wall and radially outer wall of the duct may be aerodynamic vanes or strut-vanes. The strut-vanes may be stronger (for example they may be able to withstand greater load (for example before breaking) and/or may pass greater load between the radially inner wall and the radially outer wall during use, individually and/or collectively) than the aerodynamic vanes.

Regardless of the space to chord ratio of the aerodynamic vanes, optionally, the mean camber line may be same for all vanes, at least over overlapping axial portions. However, in some arrangements, the tangent to a mean camber line at the trailing edge of an aerodynamic vane that is closest to the pressure surface of the strut-vane that defines the gap may be closer to the axial direction than is the tangent to a mean camber line at the trailing edge of an aerodynamic vane that is closest to the suction surface of the strut-vane that defines the gap. Optionally, the tangent to a mean camber line at the leading edge of an aerodynamic vane that is closest to the pressure surface of the strut-vane that defines the gap may be closer to the axial direction than is the tangent to a mean camber line at the leading edge of an aerodynamic vane that is closest to the suction surface of the strut-vane that defines the gap. In such arrangements, the tangent to the mean camber line may vary gradually (or uniformly) across the gap, or locally adjacent the pressure and/or suction surfaces of the respective strut-vanes defining the gap. Differences in the direction of the tangents to the mean camber line at the leading and/or trailing edge across the gap may result from different cambers and/or different orientations.

At least one of the strut-vanes may have one or more components of an auxiliary gas turbine engine system passing therethrough, for example so as to pass from and/or communicate between a region outside the radially outer wall of the duct and a region inside the radially inner wall of the duct. Such components may be, for example, parts of a fluid system (such as a hydraulic and/or lubrication system) and/or an electrical system (such as electrical conductors, which may be in the form of cables). In some arrangements, at least one of the strut-vanes may have a line-of-sight from the radially outer wall of the duct to the radially inner wall of the duct, for example to allow undeformable components (such as a drive shaft) to pass therethrough.

The strut-vanes may have any suitable shape. Purely by way of example, the strut-vanes may have a maximum thickness in the range of from 10% to 30% of their chord and/or a chordwise location of the maximum thickness position in the range of from 20% to 50% of the total chord length from the leading edge. The suction surface of a strut vane may be convex along its entire span, for example a complex convex curve. The pressure surface of a strut vane may be generally concave, for example it may all be concave or it may comprise concave and convex portions. Such geometry may be, for example, an average over the span of the strut-vane and/or at one or more radial positions, for example at all radial positions between 10% and 90% of the strut-vane span from the root.

Both the aerodynamic vanes and the strut-vanes may be aerofoils. The thickness of the trailing edges of both the aerodynamic vanes and the strut-vanes may be less than 5 mm, for example less than 2 mm, for example less than 1 mm.

Gas turbine engines as described and/or claimed herein may be of any suitable form. For example, the gas turbine engine may be an aero gas turbine engine for use on aircraft, such as a turbofan gas turbine engine, for example. Such an engine may be a geared turbofan gas turbine engine, in which the fan stage is driven from a turbine via a gearbox, in order to reduce (or increase) the rotational speed of the fan stage compared with the driving turbine stage(s).

The skilled person will appreciate that except where mutually exclusive, a feature described in relation to any one of the above aspects may be applied to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
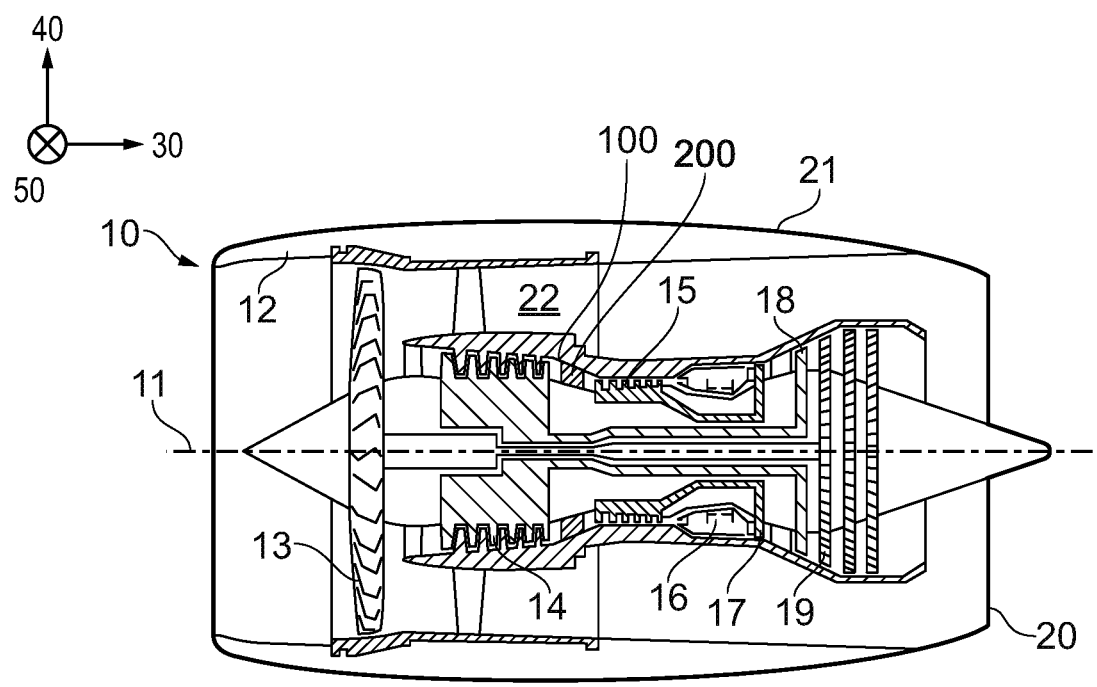
FIG. 1 is a sectional side view of a gas turbine engine in accordance with the present disclosure.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The gas turbine engine 10 comprises at least one duct, which may be an annular duct, defining a flow path for working fluid. One such duct is the duct 100 shown in FIG. 1 that extends between the intermediate pressure compressor 14 (for example from the exit of the intermediate pressure compressor 14) and the high pressure compressor 15 (for example to the inlet of the high pressure compressor 15). Such a duct 100 comprises turning vanes 200, which may be stationary vanes 200, which may be referred to as stationary lifting vanes 200.

The gas turbine engine 10 and/or the duct 100 (described in more detail elsewhere herein) and/or the turning vanes 200 (described in more detail elsewhere herein) shown in FIG. 1 may be in accordance with examples of the present disclosure, aspects of which are described by way of example only in relation to FIGS. 2 to 7.

Other gas turbine engines to which the present disclosure may be applied may have related or alternative configurations. By way of example such engines may have an alternative number of interconnecting shafts (e.g. two) and/or an alternative number of compressors and/or turbines. Further the engine may (or may not) comprise a gearbox provided in the drive train from a turbine to a compressor and/or fan. Whilst the described example relates to a turbofan engine, the disclosure may apply, for example, to any type of gas turbine engine, such as a turbojet, open rotor (in which the fan stage is not surrounded by a nacelle) or turboprop engine, for example.

The geometry of the gas turbine engine 10, and components thereof, is defined by a conventional axis system, comprising an axial direction 30 (which is aligned with the rotational axis 11), a radial direction 40, and a circumferential direction 50 (shown perpendicular to the page in the FIG. 1 view). The axial, radial and circumferential directions 30, 40, 50 are mutually perpendicular.

Figure 2:
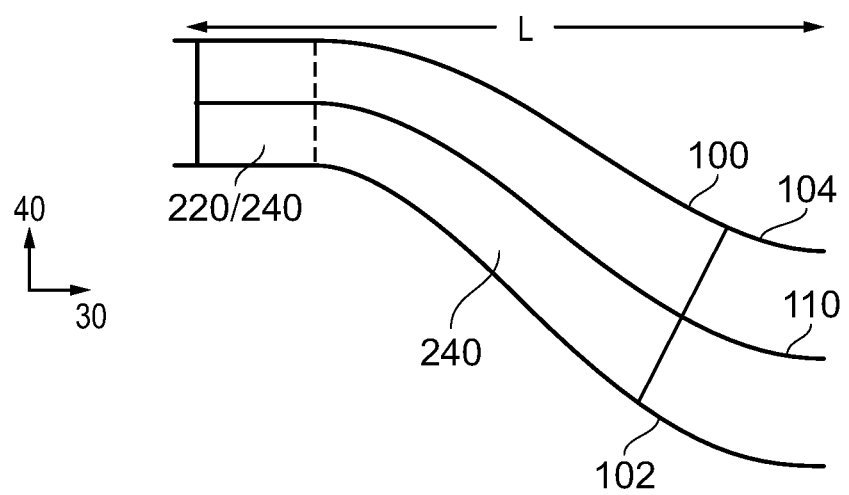
FIG. 2 is a side view of a gas turbine engine duct with vanes in accordance with the present disclosure.

FIG. 2 shows a side view (which may be defined as a view looking along a circumferential direction 50) of the duct 100, which extends between a radially inner wall 102 and a radially outer wall 104, in greater detail. The duct 100 has a length L, which may be defined as a length from the exit of the intermediate pressure compressor 14 to the inlet of the high pressure compressor 15. The length L may be shorter than equivalent ducts in conventional engines, at least in part because of the arrangement of the annular array of turning vanes 200 described and/or claimed herein. The duct 100 extends in an axial direction 30. At least a part of the duct 100 (for example the inner wall 102 and outer wall 104) moves radially inboard with downstream axial position. The duct 100 may be described as an annular duct 100. The duct 100 may be referred to as on "s-shaped" duct or a "swan-necked" duct.

Figure 3:
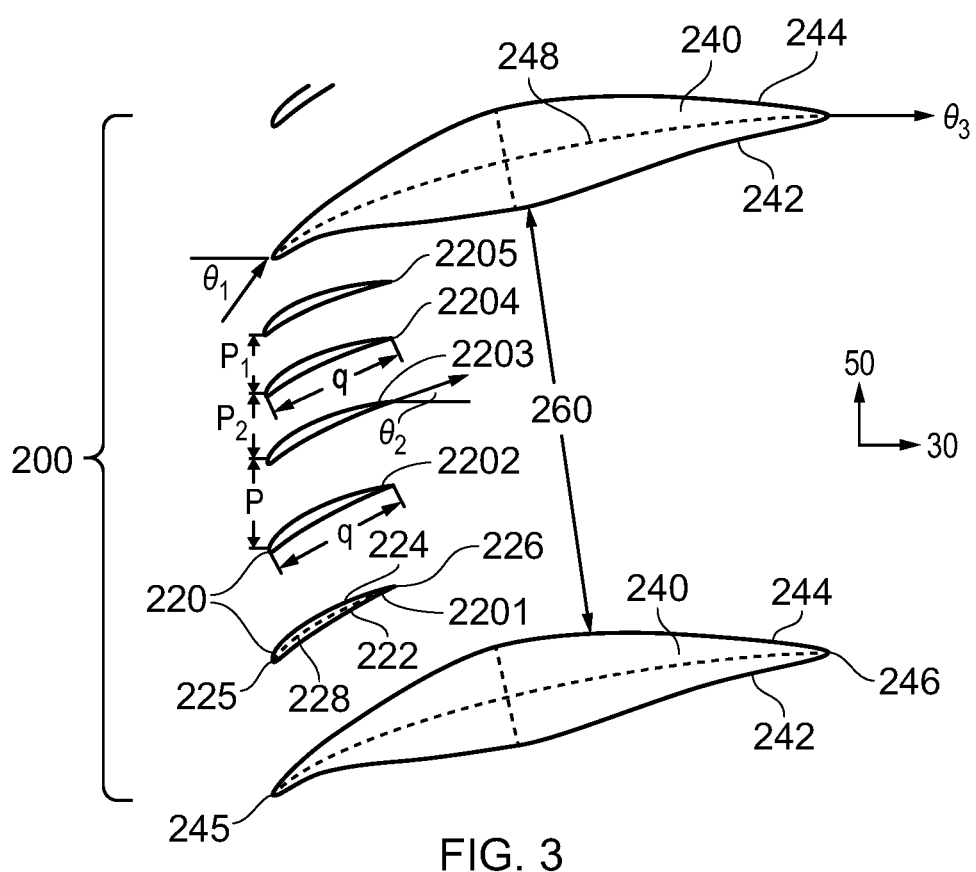
FIG. 3 is a cross-section through an array of turning vanes provided in a duct in accordance with the present disclosure.

The duct 100 has an array of turning vanes 200 provided therein. The array of turning vanes 200 comprises aerodynamic vanes 220 and strut-vanes 240. An example of such an array of turning vanes 200 is shown in FIG. 3, with a close-up view of a strut-vane 240 and a neighbouring aerodynamic vane 220 in FIG. 5. The cross-sections shown in FIGS. 3, 4, 5 and 7 may be taken, for example, along surface defined by the radial midpoints between the inner and outer walls 102, 104 of the duct 100, as indicated by the line 110 shown in FIG. 2.

The aerodynamic vanes 220 are provided in a gap 260 defined by a suction surface 244 of on strut-vane 240 and a pressure surface 242 of an adjacent strut-vane 240. Although five aerodynamic vanes 220 are shown as being provided in the gap 260 in the FIG. 3 example, any number of aerodynamic vanes 220 may be provided in the gap 260, for example 2, 3, 4, 5, 6, 7, 8, 9, 10, 11, 12, 13, 14, 15 or more than 15. Purely by way of example, an engine 10 may comprise on the order of 8-12 strut-vanes 240 and/or 80-120 aerodynamic vanes 220.

The strut-vanes 240 may be structural, for example providing stiffness and/or rigidity to the engine 10 in the region of the duct 100. Additionally or alternatively, the strut-vane 240 may be used to pass components of one or more auxiliary services across the duct 100, such as a drive shaft 270 or a conduit (such as an electrical or fluid conduit) 275 as shown by way of example in FIG. 5.

The axial position of the leading edges 245 of the strut-vanes 240 are axially upstream of the trailing edges 226 of the aerodynamic vanes 220, for example axially upstream of the trailing edges 226 of the adjacent aerodynamic vanes 220. The axial position of the leading edges 245 of the strut-vanes 240 may be axially between the leading edges 225 and the trailing edges 226 of the aerodynamic vanes 220, for example at least of the adjacent aerodynamic vanes 220. The axial position of the leading edges 245 of the strut-vanes 240 may be the same as the axial position of the leading edges 225 of the aerodynamic vanes 220, as in the examples of FIGS. 3 to 5 and 7.

The axial position of the trailing edges 246 of the strut-vanes 240 are downstream of the axial position of the trailing edges 226 of the aerodynamic vanes 220.

The chord length (indicated by the letter C in FIG. 5) of the strut-vanes 240 is greater than the chord length of the aerodynamic vanes 220. The strut-vanes 240 and aerodynamic vanes 220 may have any desired shape. Purely by way of example, the location of the maximum thickness (T in FIG. 5) of a strut-vane may be at less than 60%, for example between 20% and 50%, of the total chord length C from the leading edge 245. By way of further example the maximum thickness 't' may be in the range of from 10% to 30% of the chord 'C'. Whilst only exemplary, this may be beneficial in providing good aerodynamic performance (for example efficient flow turning) whilst meeting any structural (for example load bearing) requirements and/or providing sufficient space to pass auxiliary components therethrough.

The strut-vanes 240 are turning vanes. The strut-vanes 240 have a camber line 248 that may be curved. The camber line 248 may be curved at axial positions both upstream and downstream of the axial location of the trailing edge 226 of the aerodynamic vane 220. The strut-vane 240 may provide flow turning both upstream and downstream of the axial location of the trailing edge 226 of the aerodynamic vane 220.

FIG. 3 shows angle $\theta_1$, $\theta_2$, $\theta_3$. $\theta_1$ represents the angle of the mean camber line 248 of the strut-vanes 240 (and in the FIG. 3 example the aerodynamic vanes 220) relative to the axial direction 30 at the leading edge 245. $\theta_2$ represents the angle of the mean camber line 228 of the aerodynamic vanes 220 relative to the axial direction 30 at their trailing edge 226. $\theta_3$ represents the angle of the mean camber line 248 of the strut-vanes 240 relative to the axial direction 30 at their trailing edge 246. Alternatively, $\theta_1$ may be defined as the swirl angle (for example at mid-span) of the flow (at a representative operating condition of the engine, for example at cruise conditions) at entry to the annular array of turning vanes 200; $\theta_2$ may be defined as the swirl angle (for example at mid-span) of the flow (at a representative operating condition of the engine, for example at cruise conditions) at the trailing edge 226 of the aerodynamic vanes 220; and $\theta_3$ may be defined as the swirl angle (for example at mid-span) of the flow (at a representative operating condition of the engine, for example at cruise conditions) at the trailing edge 246 of the strut-vanes 240. The values of $\theta_1$, $\theta_2$, $\theta_3$ may be as described and/or claimed herein. For example, $\theta_1$ may be in the range of from 30 degrees and 70 degrees, $\theta_2$ may be in the range of from 5 degrees and 40 degrees, and $\theta_3$ may be in the range of from 0 degrees and 15 degrees. The flow may comprise substantially no swirl (that is, it may have substantially no circumferential component) downstream of the strut-vanes 240, as in the FIG. 3 example. In some arrangements in accordance with the present disclosure, the angle $\theta_2$ may be different for different aerodynamic vanes in the array of turning vanes 200. Purely by way of example, the aerodynamic vanes 510-550 provided in the gap 260 in the arrangement shown in FIG. 4 (which is described in greater detail below) may have different mean camber line angles at their trailing edges to each other, and thus the angle $\theta_2$ may be different for each of the aerodynamic vanes 510-550.

The camber line 248 of the strut vane may be such that significant flow turning occurs downstream of the axial position of the trailing edge of the aerodynamic vanes 220. For example, the value of $\theta_2-\theta_3$ may be in the range of from 5 degrees to 30 degrees. Where the angle $\theta_2$ is different for different aerodynamic vanes (e.g. 510-550) in the gap 260, the value of $\theta_2-\theta_3$ may be in the range of from 5 degrees to 30 degrees for all, or most, of the aerodynamic vanes, for example.

Figure 5:
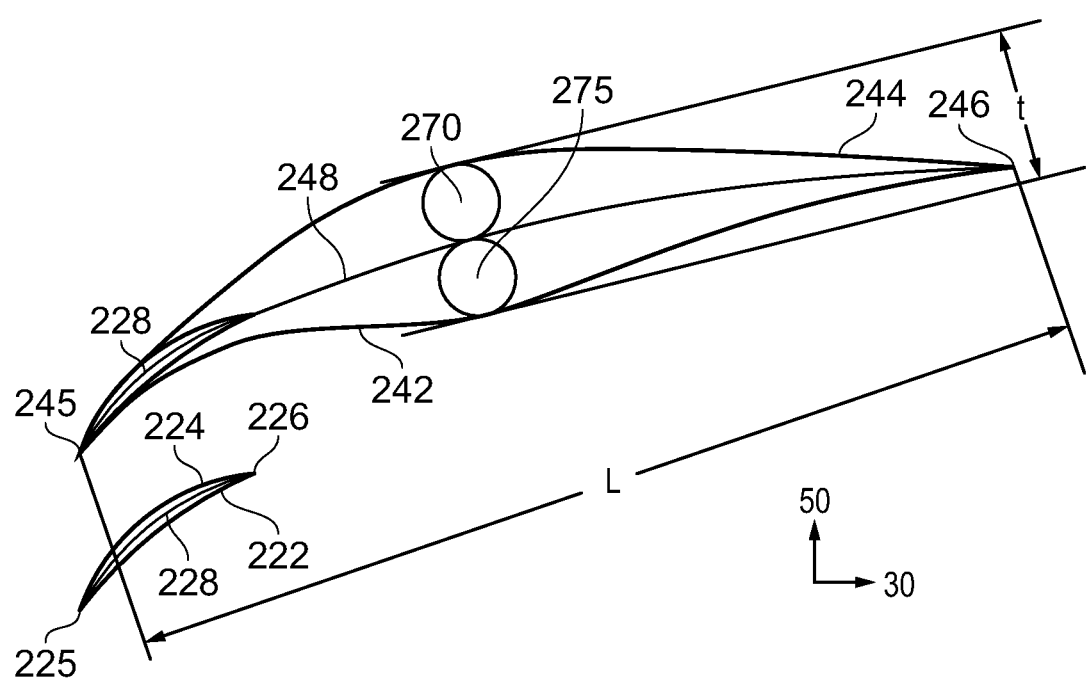
FIG. 5 is an enlarged cross-section through aerodynamic vanes and a strut-vane in accordance with the present disclosure.
Figure 6A:
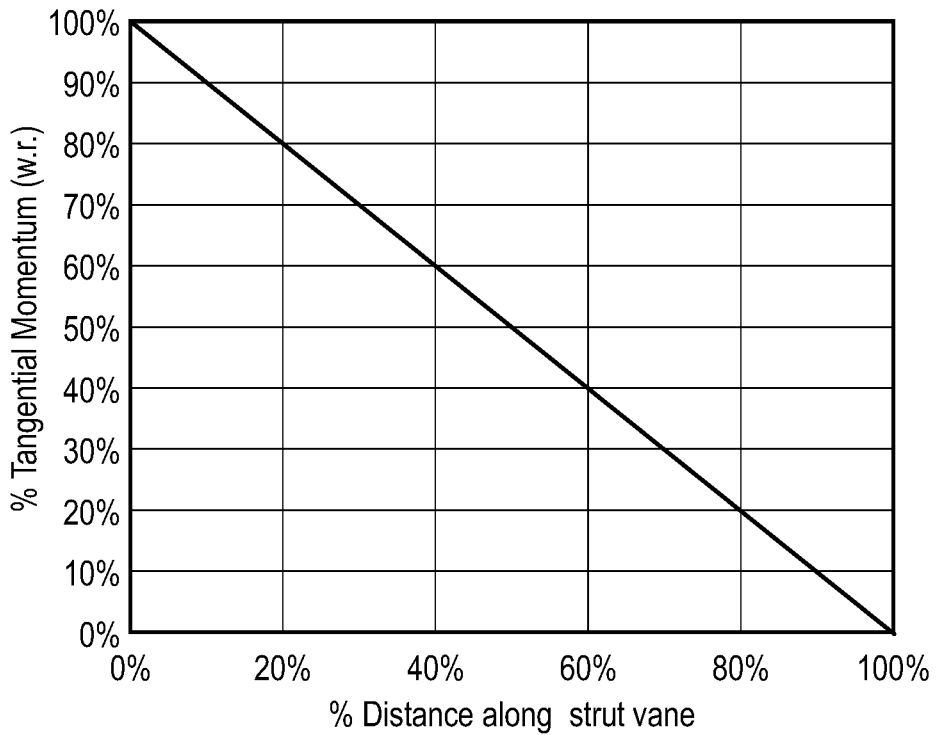
FIGS. 6a to 6d are graphs showing examples of possible flow turning distributions that may be provided by strut-vanes in accordance with the present disclosure.
Figure 6B:
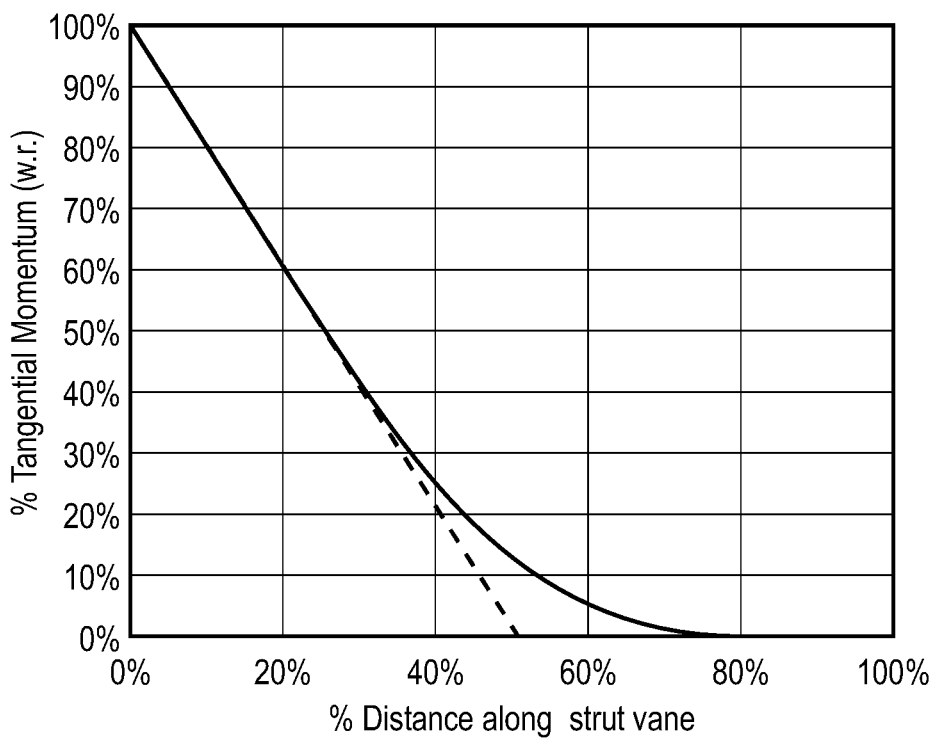
Figure 6C:
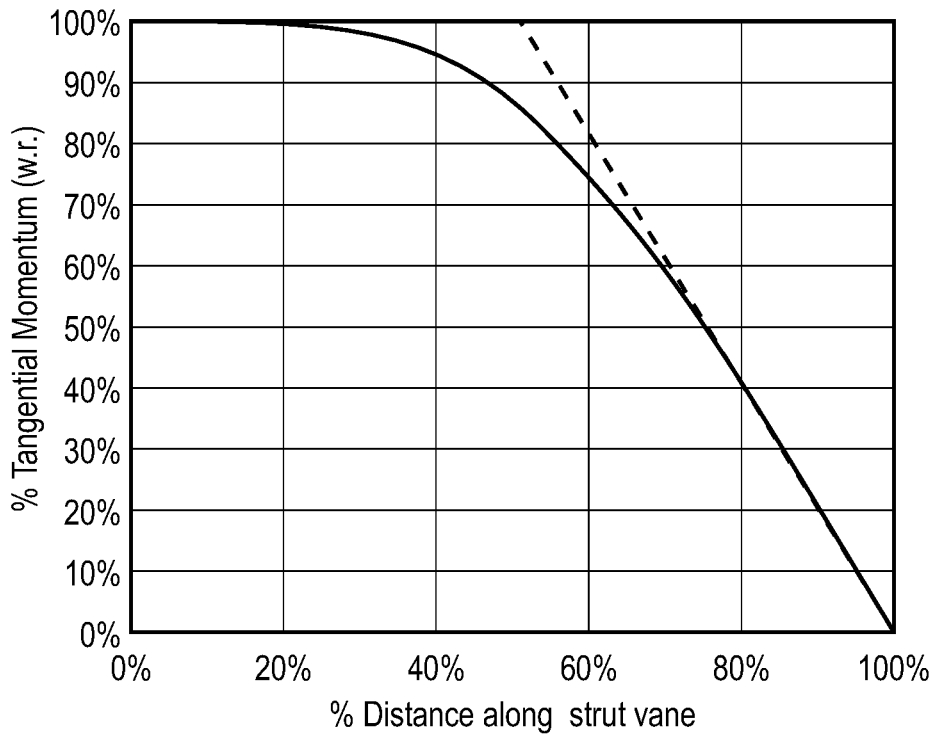
Figure 6D:
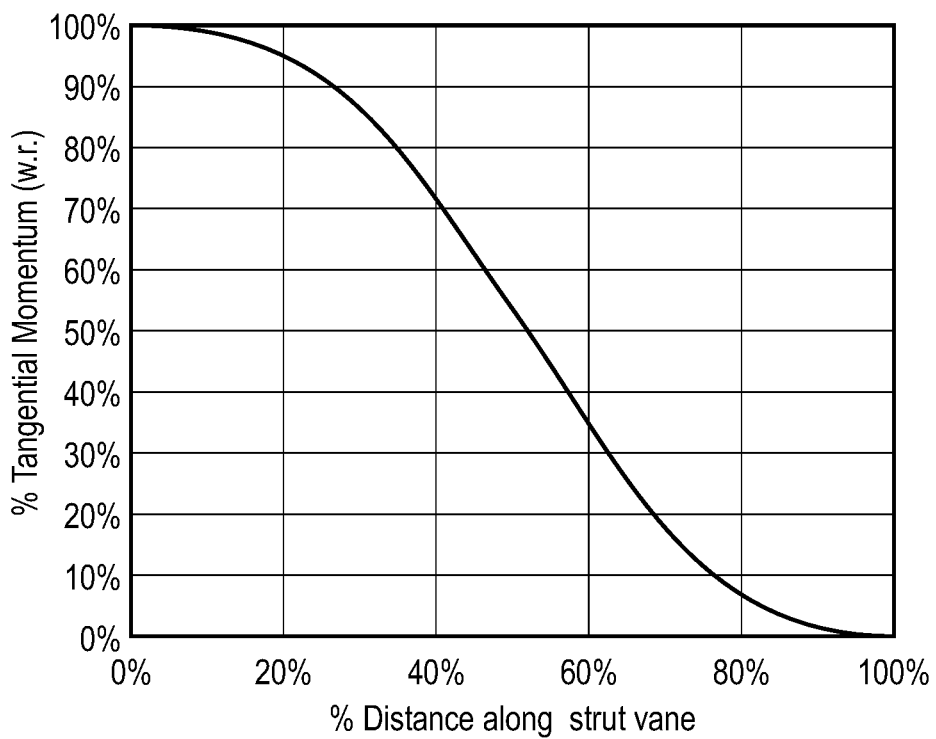

Purely to aid explanation, the strut-vane 240 shown in FIG. 5 has an aerodynamic vane 220 of the exemplary arrangement of FIG. 3 superimposed thereon. As illustrated in FIG. 5, by way of example, the camber line 248 of the strut-vane 240 may be the same as the camber line 228 of the aerodynamic vane 220 in the axial regions where the aerodynamic vanes 220 and strut-vanes 240 overlap, for example between the leading edge 225 and trailing edge 226 of the aerodynamic vanes 220. Where not all of the vanes 220 are identical, the camber line 248 of the strut-vane 240 may be the same as the camber line 228 of the aerodynamic vane 220 that is closest to the pressure surface 242 or the suction surface 244 of the strut-vane, or may be the average of the camber lines 228 of the aerodynamic vanes 220 that is closest to the pressure surface 242 and the suction surface 244 of the strut-vane in the regions of axial overlap, for example. In other arrangements, the camber line 248 of the strut-vane 240 may not be the same as the camber line 228 of the aerodynamic vane 220 in the axial regions where the aerodynamic vanes 220 and strut-vanes 240 overlap.

Figure 4:
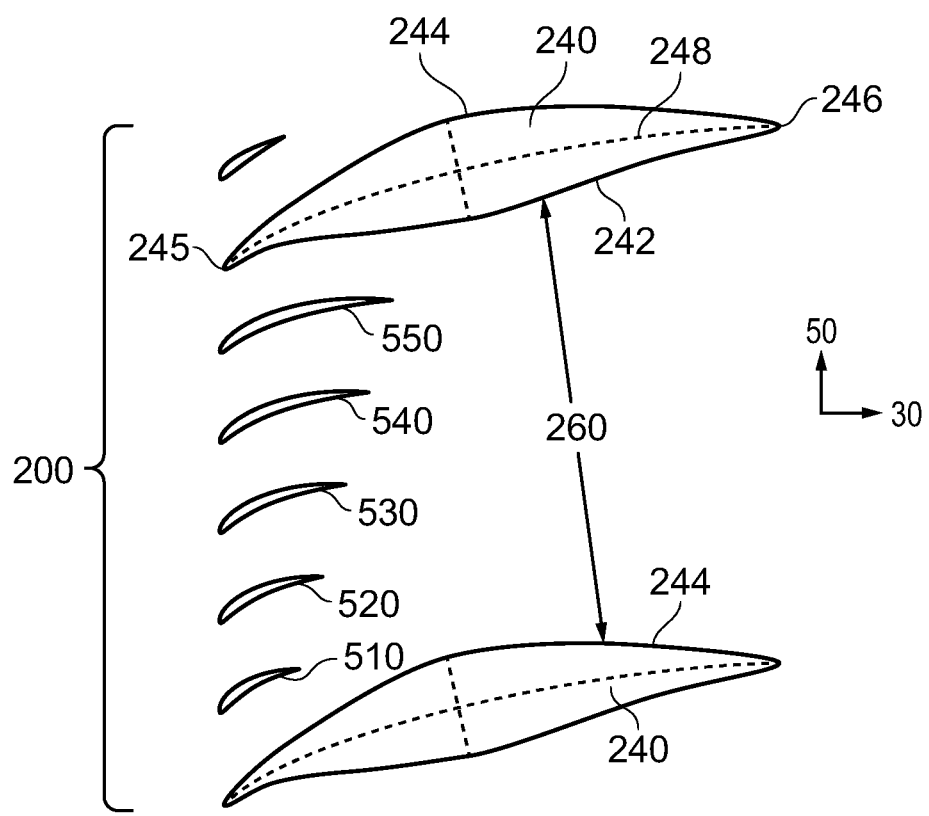
FIG. 4 is a cross-section through an array of turning vanes provided in a duct in accordance with the present disclosure.

In FIGS. 3 and 4, the space to chord ratio of the aerodynamic vanes varies across the gap 260 between neighbouring strut-vanes 240. In FIG. 3, the aerodynamic vanes 220 are individually labelled 2201, 2202, 2203, 2204, 2205. In both FIGS. 3 and 4 the space to chord ratio of the aerodynamic vanes 2201, 2202, 510, 520 nearer to the suction surface 244 of a strut-vane 240 is greater than the space to chord ratio of the aerodynamic vanes 2204, 2205, 540, 550 nearer to the pressure surface 242 of a strut-vane 240. The term space to chord ratio may be as defined elsewhere herein, with the pitch (or spacing) indicated by the letter 'p' in FIGS. 3 and 4, and the chord indicated by the letter 'q' in FIGS. 3 and 4.

Purely by way of example, in FIG. 3, the chord q of all of the aerodynamic vanes 2201-2205 may be substantially the same, with the spacing p reducing from the suction surface 244 of a strut-vane 240 defining the gap 260 to the pressure surface 242 of the other strut-vane 240 defining the gap 260. As noted elsewhere herein, the space to chord ratio (or solidity) for a particular vane may be defined as the average spacing between that vane and the two adjacent vanes divided by the vane chord. By way of example, for the vane labelled 2204 in FIG. 3, the space to chord ratio may thus be given by the average spacing between itself and its adjacent vanes 2203, 2205 (given by $(p_1+p_2)/2$) divided by its chord q.

Purely by way of further example, in FIG. 4, the spacing p between neighbouring aerodynamic vanes 510-550 may be substantially across the gap 260, with the chord q of the aerodynamic vanes increasing from the suction surface 244 of a strut-vane 240 defining the gap 260 to the pressure surface 242 of the other strut-vane 240 defining the gap 260. Similarly, in FIG. 7 (described in greater detail below), the chord q of the aerodynamic vanes increases from the suction surface 244 of a strut-vane 240 defining the gap 260 to the pressure surface 242 of the other strut-vane 240 defining the gap 260.

It will be appreciated that arrangements other than those explicitly described herein may be in accordance with the present disclosure. For example, in some arrangements both the chord q and the spacing p of the aerodynamic vanes may vary across the gap 260.

As noted elsewhere herein, the aerodynamic vanes 220 and/or the strut-vanes 240 may take any desired shape. FIGS. 6a to 6d show examples of how the percentage of tangential momentum (which may be a measure of swirl angle) may vary along a streamline in the duct 100 against the percentage distance along a strut-vane 240, for example against the percentage along the camber line 280. Thus, for example, the tangential momentum may be removed linearly (as in FIG. 6a), or the removal may be biased towards the upstream portion (as in FIG. 6b), downstream portion (as in FIG. 6c) or central portion (as in FIG. 6d). In FIGS. 6a to 6d, the percentage of tangential momentum is the tangential momentum remaining in the flow as a percentage of the tangential momentum at the leading edge 245 of the strut-vane 240. Thus, at 0% along the strut-vane 240, the percentage of tangential momentum is, by definition, 100%. In each of FIGS. 6a to 6d, the percentage of tangential momentum remaining at the trailing edge 246 (i.e. at 100% along the strut-vane 240) is 0%, but it will be appreciated that in some arrangements some tangential momentum may remain at the trailing edge 246, and thus the tangential momentum at the trailing edges 246 would not reduce to 0% in those arrangements. The percentage of tangential momentum shown in FIGS. 6a to 6d may be representative of (for example may be the same as) the camber line 280 of the strut-vanes 240.

Figure 7:
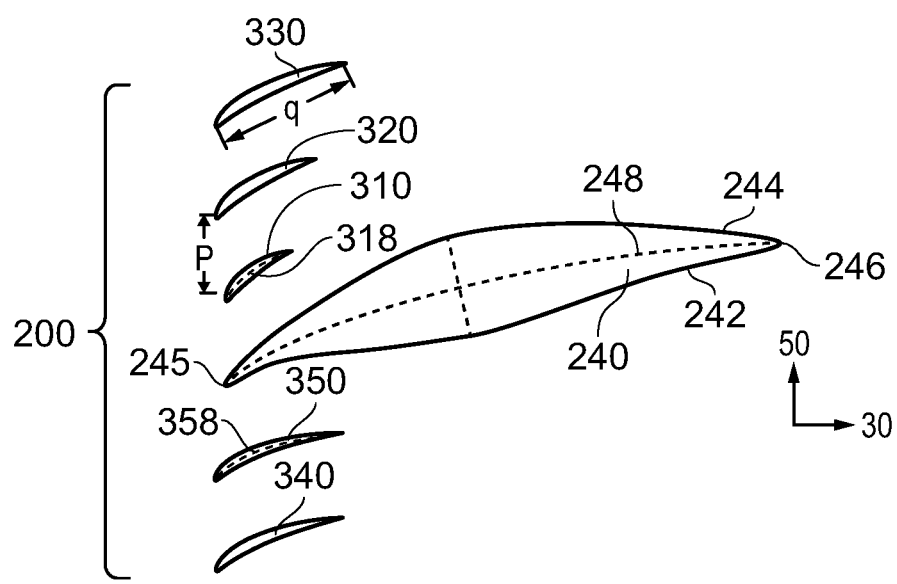
FIG. 7 is a cross-section through an array of turning vanes provided in a duct in accordance with the present disclosure.

FIG. 7 shows a further alternative arrangement in accordance with the present disclosure. In the example of FIG. 7, the aerodynamic vanes 310-350 do not all have the same camber. In particular, the trailing edge of the camber line 358 of the aerodynamic vane 350 that is closest to the pressure surface 242 of the strut-vane 240 defining the gap 260 is more closely aligned with the axial direction than the trailing edge of the camber line 318 of the aerodynamic vane 310 that is closest to the suction surface 244 of the strut-vane 240 defining the gap 260. In the FIG. 7 arrangement, the chord length q of the aerodynamic vane 310 that is closest to the suction surface 244 of the strut-vane 240 defining the gap 260 is less than the chord length q of the aerodynamic vane 350 that is closest to the pressure surface 242 of the strut-vane 240 that defines the gap 260. The space to chord ratio of the aerodynamic vanes increases moving away from the pressure surface 242 to the suction surface 244.

In an arrangement such as that of FIG. 7, the camber line 248 of the strut vane 240 may, for example, by substantially aligned with the camber line 358 of the aerodynamic vane 310 that is closest to the pressure surface 242 of the strut-vane 240 where the strut-vane 240 and the aerodynamic vane 350 axially overlap, as in the FIG. 7 example. In alternative arrangements, the camber line 248 of the strut vane 240 may, for example, be substantially aligned with the average of the camber lines 318, 358 of the aerodynamic vanes 310, 350 that are closest to the pressure surface 242 and suction surface 244 of the strut-vane 240 where the strut-vane 240 and the aerodynamic vanes 350 axially overlap. Alternatively still, as with any arrangement in accordance with the present disclosure, the camber line 248 of the strut-vane 240 may not be related to the camber lines 318, 358 of the aerodynamic vanes 310-350.

The absolute and/or relative geometry (such as the camber, chord and/or thickness) and positions (such as the positions of the leading edges 225, 245 and/or trailing edges 226, 246 of the aerodynamic vanes 220 and strut-vanes 240) of any feature (such as the duct 100, turning vane array 200, strut-vanes 240 and aerodynamic vanes 220) described, for example in relation to any one of the Figures, and/or claimed herein may apply to any arrangement in accordance with the disclosure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine defining axial, radial and circumferential directions and comprising:
   a duct defined by an axially extending radially inner wall and an axially extending radially outer wall, wherein:
   an annular array of turning vanes is provided in the duct, the array comprising a set of cambered aerodynamic vanes and a set of cambered strut-vanes, each having leading edges and trailing edges;
   a plurality of the aerodynamic vanes are provided in a gap defined by a suction surface of one of the strut-vanes and a pressure surface of another of the strut-vanes;
   the leading edges of the strut-vanes are axially upstream of the trailing edges of the aerodynamic vanes;
   the trailing edges of the strut-vanes extend further axially downstream than the trailing edges of the aerodynamic vanes; and
   the space to chord ratio of the aerodynamic vanes in the gap that are closest to the suction surface of the strut-vane is higher than the space to chord ratio of aerodynamic vanes in the gap that are closest to the pressure surface of the strut-vane.

2. A gas turbine engine according to claim 1, wherein the space to chord ratio of the aerodynamic vanes increases continuously across the entire gap from the pressure surface of the strut-vane that defines the gap to the suction surface of the other strut-vane that defines the gap.

3. A gas turbine engine according to claim 1, wherein the space to chord ratio of the aerodynamic vanes increases uniformly across the gap from the pressure surface of the strut-vane that defines the gap to the suction surface of the other strut-vane that defines the gap.

4. A gas turbine engine according to claim 1, wherein the space to chord ratio of the aerodynamic vanes is uniform across at least a portion of the gap.

5. A gas turbine engine according to claim 1, wherein the spacing (p) between the two aerodynamic vanes that are closest to the suction surface of the strut-vane that defines the gap is greater than the spacing between the two aerodynamic vanes that are closest to the pressure surface of the strut-vane that defines the gap.

6. A gas turbine engine according to claim 1, wherein the chord length (q) of the aerodynamic vane that is closest to the suction surface of the strut-vane that defines the gap is smaller than the chord length of the aerodynamic vane that is closest to the pressure surface of the strut-vane that defines the gap.

7. A gas turbine engine according to claim 1, wherein the spacing between all of the aerodynamic vanes is uniform across the gap.

8. A gas turbine engine according to claim 1, wherein all of the aerodynamic vanes in the gap have the same chord length.

9. A gas turbine engine according to claim 1, wherein a tangent ($\theta_3$) to a mean camber line of the strut-vanes is more closely aligned to the axial direction than is a tangent ($\theta_2$) to a mean camber line at the trailing edge of the aerodynamic vanes.

10. A gas turbine engine according to claim 1, wherein the mean camber line of the strut-vanes is substantially the same as the mean camber line of the aerodynamic vanes for axial locations between the leading and trailing edges of the aerodynamic vanes.

11. A gas turbine engine according to claim 1, further comprising:
    a first compressor section; and
    a second compressor section that is axially downstream of the first compressor section, wherein:
    the duct is provided between the first compressor section and the second compressor section, with each of the radially inner wall and radially outer wall extending axially downstream and radially inboard as it extends away from the first compressor section towards the second compressor section.

12. A gas turbine engine according to claim 11, wherein:
    the first compressor section comprises rotor blades that are connected to a first shaft that is also connected to a first turbine;
    the second compressor section comprises rotor blades that are connected to a second shaft that is also connected to a second turbine; and
    in use, the rotational speed of the second shaft is higher than the rotational speed of the second shaft.

13. A gas turbine engine according to claim 11, wherein:
    the first compressor section comprises at least two stages, each stage comprising a rotor row and a stator row; and
    the second compressor section comprises at least two stages, each stage comprising a rotor row and a stator row, wherein:
    immediately upstream of the annular array of turning vanes is a rotor row of the first compressor section; and immediately downstream of the annular array of turning vanes is a rotor row of the second compressor section.

14. A gas turbine engine according to claim 1, wherein the axial position of the leading edges of the aerodynamic vanes is the same as the axial position of the leading edge of the strut-vanes.

15. A gas turbine engine according to claim 1, wherein:
the tangent ($\theta_2$) to the mean camber line of the aerodynamic vanes at the trailing edge is in the range of from 5 degrees to 40 degrees from the axial direction; or
tangent ($\theta_3$) to the mean camber line of the vanes of the strut-vanes at the trailing edge is in the range of from 0 degrees to 15 degrees from the axial direction; or
the mean camber line of the strut-vanes turns towards the axial direction by an angle in the range of from 5 degrees and 30 degrees between the axial position of the trailing edge of the aerodynamic vanes and the trailing edge of the strut-vanes.

16. A gas turbine engine according to claim 1, wherein the only features that extend between the radially inner wall and radially outer wall of the duct are aerodynamic vanes or strut-vanes.

17. A gas turbine engine according to claim 1, wherein:
the tangent to a mean camber line at the trailing edge of an aerodynamic vane that is closest to the pressure surface of the strut-vane that defines the gap is closer to the axial direction than is the tangent to a mean camber line at the trailing edge of an aerodynamic vane that is closest to the suction surface of the strut-vane that defines the gap.

18. A gas turbine engine according to claim 1, wherein at least one of the strut-vanes has components of an auxiliary gas turbine engine system passing therethrough.

19. A gas turbine engine according to claim 1, wherein:
the strut-vanes have a maximum thickness (t) in the range of from 10% to 30% of their chord; or
the chordwise location of the maximum thickness position of the strut-vanes is in the range of from 20% to 50% of the total chord length from the leading edge.

20. A gas turbine engine according to claim 1, wherein the thickness of the trailing edges of both the aerodynamic vanes and the strut-vanes is less than 5 mm.

* * * * *